US008625549B2

(12) United States Patent
Han

(10) Patent No.: US 8,625,549 B2
(45) Date of Patent: Jan. 7, 2014

(54) CALL PROCESSING IN DUAL MODE TERMINAL

(75) Inventor: Jae-Hoon Han, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1036 days.

(21) Appl. No.: 11/641,892

(22) Filed: Dec. 20, 2006

(65) Prior Publication Data

US 2007/0171894 A1 Jul. 26, 2007

(30) Foreign Application Priority Data

Jan. 26, 2006 (KR) .................. 10-2006-0008585

(51) Int. Cl.
H04W 4/00 (2009.01)
H04W 40/00 (2009.01)

(52) U.S. Cl.
USPC ........ 370/338; 455/435.1; 455/445; 455/466; 455/552.1

(58) Field of Classification Search
USPC ............. 370/338; 455/435.1, 445, 466, 552.1
See application file for complete search history.

(56) References Cited

U.S. PATENT DOCUMENTS

| 7,395,085 | B1* | 7/2008 | Mauer et al. ................ 455/552.1 |
| 7,406,324 | B1* | 7/2008 | McConnell ................... 455/466 |
| 2004/0002330 | A1* | 1/2004 | Chitrapu .................... 455/426.2 |
| 2005/0190747 | A1* | 9/2005 | Sindhwani et al. .......... 370/352 |
| 2005/0198257 | A1* | 9/2005 | Gupta et al. ................. 709/224 |
| 2006/0025141 | A1* | 2/2006 | Marsh et al. ................. 455/445 |
| 2007/0142047 | A1* | 6/2007 | Heeschen et al. .......... 455/435.1 |

FOREIGN PATENT DOCUMENTS

| KR | 10-2005-0069003 | 7/2005 |
| KR | 10-2005-0117398 | 12/2005 |

OTHER PUBLICATIONS

Korean Office Action corresponding to Korean Patent Application No. 2006-0008585, issued on Dec. 14, 2006.
Korean Decision of Grant corresponding to Korean Patent Application No. 2006-0008585, issued on May 11, 2007.
Extended European Search Report dated Feb. 5, 2010.

* cited by examiner

Primary Examiner — Meless N Zewdu
Assistant Examiner — William Nealon
(74) Attorney, Agent, or Firm — H.C. Park & Associates, PLC

(57) ABSTRACT

In a dual mode terminal capable of providing at least two telecommunication services using different wireless technologies together, call processing is facilitated for one telecommunication service to be effected reflecting a telecommunication state of the other telecommunication service, thereby preventing call collisions.

15 Claims, 3 Drawing Sheets

CALL PROCESSING IN DUAL MODE TERMINAL

CLAIM OF PRIORITY

This application makes reference to, incorporates the same herein, and claims all benefits accruing under 35 U.S.C.§119 from an application for APPARATUS AND METHOD FOR CALL PROCESSING IN DUAL MODE TERMINAL earlier filed in the Korean Intellectual Property Office on the 26 Jan. 2006 and there duly assigned Serial No. 10-2006-0008585.

BACKGROUND OF THE INVENTION

1. Field of the Invention

The present invention relates to an apparatus and method of call processing in a dual mode terminal.

2. Description of the Related Art

A dual mode terminal is a terminal capable of supporting at least two wireless technologies, i.e., a terminal capable of providing communication services supported by at least two wireless technologies together. In other words, a dual mode terminal is a terminal having a call processing function based on two or more wireless technologies.

The need for dual mode terminals is increasing as a result of diversification of wireless technology available to a terminal user (referred to as "user" below) provided with communication service using a terminal and mixing of different types of wireless networks. According to a request of a user, a dual mode terminal can be embodied to support some or all wireless technologies such as Code Division Multiple Access (CDMA), Wireless Local Area Network (WLAN), Wireless Broadband Internet (WiBro), and Wireless Fidelity (WiFi).

However, a dual mode terminal has a problem in that one wireless technology can interfere with the use of another wireless technology since a plurality of wireless technologies are supported together. In particular, when calls supported by different wireless technologies are simultaneously received, there is a high probability of the calls colliding. Such a collision occurs in a dual mode terminal because a conventional dual mode terminal does not take into consideration the relationship between wireless technologies embodied in the dual mode terminal.

For example, assuming that a dual mode terminal based on a CDMA function supports a WLAN function, a Voice over Internet Protocol (VoIP) function based on a WLAN is performed independently, without regard to the CDMA function. In other words, the relationship between the VoIP function and the CDMA function is not considered at all.

A microphone and speaker are required for voice telecommunication. However, the microphone and speaker cannot be used simultaneously for the CDMA function and the VoIP function. When a VoIP phone call is made during a CDMA call without considering the relationship between the CDMA function and the VoIP function, the microphone and speaker cannot be used for the VoIP call. Moreover, since the microphone and speaker are used preferentially for CDMA telecommunication via the dual mode terminal based on the CDMA function, the VoIP function and the CDMA function cannot be used together practically without considering their relationship in the terminal. When CDMA and VoIP programs are used together without considering their relationship, the user has to constantly consider the possibility of collision.

This problem can seriously detract from the efficiency and convenience of the dual mode terminal.

SUMMARY OF THE INVENTION

It is an object of the present invention to provide an apparatus and method of call processing in a dual mode terminal capable of preventing a collision of calls embodied by different wireless technologies during call processing.

It is another object of the present invention to provide an apparatus and method of call processing in a dual mode terminal supporting a Wireless Local Area Network (WLAN) and Code Division Multiple Access (CDMA) and capable of preventing a collision of a WLAN call and a CDMA call during call processing.

It is yet another object of the present invention to provide an apparatus and method of call processing in a dual mode terminal supporting a WLAN and CDMA and capable of processing a Voice over Internet Protocol (VoIP) call made during a CDMA call prior to the CDMA telecommunication according to a request of a user during call processing.

One aspect of the present invention is to provide a call processing apparatus of a dual mode terminal, the apparatus including: a Code Division Multiple Access (CDMA) call processor adapted to facilitate a CDMA call service via a CDMA network; and a Voice over Internet Protocol (VoIP) call processor adapted to determine a CDMA call state, to configure a VoIP call mode in accordance with the determination result, and to facilitate a VoIP call service via a Wireless Local Area Network (WLAN) in accordance with the configured call mode.

The CDMA call state preferably includes one of either a connected state or a disconnected state.

The VoIP call processor is preferably adapted to reject a received VoIP call in response to a determination that the CDMA call state is the connected state. The VoIP call processor is preferably adapted to register a rejection request corresponding to the received VoIP call in a VoIP call server. The VoIP call processor is preferably adapted to register the rejection request corresponding to the received VoIP call in a VoIP call server using a Session Initiation Protocol (SIP) message. The VoIP call processor preferably includes: a CDMA call state determination unit adapted to receive information on the CDMA call state via either an event function or an Application Program Interface (API), and to determine the CDMA call state; a VoIP call mode setting unit adapted to configure the VoIP call mode in accordance with the determined CDMA call state; and a VoIP call control unit adapted to process a VoIP call in accordance with the configured VoIP call mode. The VoIP call processor is preferably adapted to request the CDMA call processor to configure a CDMA call mode corresponding to a VoIP call state.

The apparatus preferably further includes a voice communicator adapted to perform a voice input/output function to facilitate either the CDMA call or the VoIP call.

The VoIP call processor is preferably adapted to process the CDMA call according to previously stored configuration information in response to a determination that a CDMA call has been received during the VoIP call,. The VoIP call processor is preferably adapted to inform a user that the CDMA call has been received via at least one of vibration, a lamp flicker, or an indicator display upon a determination that the CDMA call has been received during the VoIP call.

Another aspect of the present invention is to provide a call processing apparatus of a dual mode terminal, the apparatus including: a first call processor adapted to facilitate a first telecommunication service via a first network; and a second call processor adapted to determine a state of the first telecommunication service facilitated by the first call processor, to configure a second telecommunication service in accordance with the determination result, and to facilitate the second telecommunication service in accordance with the configuration via a second network.

One of the first network and the second network preferably includes at least one of a Code Division Multiple Access (CDMA) network, a Wireless Local Area Network (WLAN), a Wireless Broadband Internet (WiBro) network, or a Wireless Fidelity (WiFi) network.

Still another aspect of the present invention is to provide a method of call processing in a dual mode terminal, the method including: determining a Code Division Multiple Access (CDMA) call state; configuring a Voice over Internet Protocol (VoIP) call mode corresponding to the determined CDMA call state; and processing a created VoIP call in accordance with the configured VoIP call mode.

The method preferably further includes registering the set VoIP call mode in a VoIP call server.

The CDMA call state preferably includes one of either a connected state or a disconnected state.

Configuring a VoIP call mode preferably includes configuring the VoIP call mode to be a VoIP call rejection mode in response to the determined CDMA call state being the connected state.

A VoIP call rejection request is preferably registered in the VoIP call server using a Session Initiation Protocol (SIP) message in response to the VoIP call rejection mode being configured.

Yet another aspect of the present invention is to provide a method of call processing in a dual mode terminal, the method including: determining a telecommunication state of a first telecommunication service effected via a first network; configuring a telecommunication mode of a second telecommunication service corresponding to the determined telecommunication state; and facilitating call processing for telecommunication of the second telecommunication service via a second network in accordance with the configured telecommunication mode.

One of the first network and the second network preferably includes at least one of a Code Division Multiple Access (CDMA) network, a Wireless Local Area Network (WLAN), a Wireless Broadband Internet (WiBro) network, and a Wireless Fidelity (WiFi) network.

BRIEF DESCRIPTION OF THE DRAWINGS

A more complete appreciation of the present invention and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

Hereinafter, exemplary embodiments of the present invention are described in detail with reference to the accompanying drawings. In the following description, a detailed description of known functions and configurations incorporated herein has been omitted for conciseness.

The most typical type of dual mode terminal that is currently being suggested is a dual mode terminal capable of supporting a Code Division Multiple Access (CDMA) function and a Wireless Local Area Network (WLAN) function together, among wireless technologies such as CDMA, WLAN, Wireless Broadband Internet (WiBro), and Wireless Fidelity (WiFi). Therefore, the present invention is described below with reference to exemplary embodiments in which the present invention is applied to a dual mode terminal capable of supporting CDMA and a WLAN together. A terminal mentioned in the embodiments described below is a dual mode terminal particularly formed into a CDMA terminal supporting a WLAN.

Figure 1:
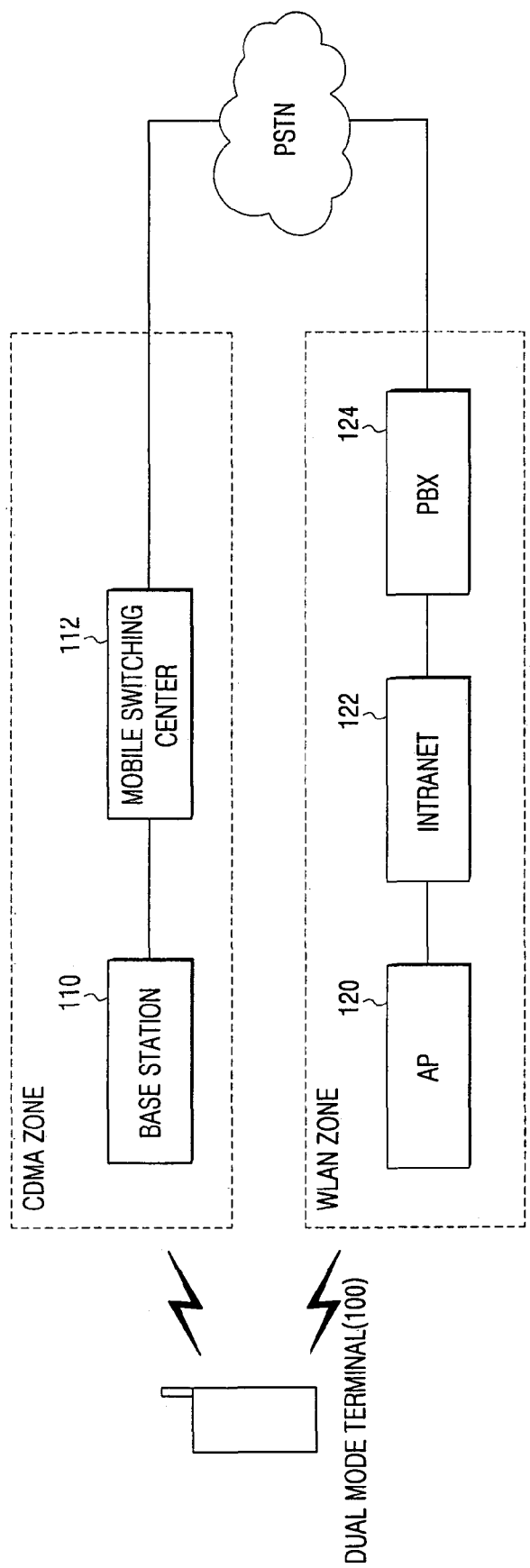
FIG. 1 is a block diagram of a network to which the present invention can be applied.

FIG. 1 is a block diagram of a network to which the present invention can be applied.

A dual mode terminal 100 illustrated in FIG. 1 can support CDMA and a WLAN. The dual mode terminal 100 can perform CDMA telecommunication in a CDMA zone, and voice over Internet protocol (VoIP) telecommunication in a WLAN zone.

The CDMA zone can be embodied by a CDMA network including a base station 110 for providing the dual mode terminal 100 with wireless resources, and a mobile switching center 112 performing call switching. The dual mode terminal existing in the CDMA zone can be provided with a CDMA telecommunication service via the CDMA network.

The WLAN zone can be embodied by a WLAN network including an Access Point (AP) 120 for providing the dual mode terminal 100 with wireless resources, an intranet 122 connecting the AP 120 to a core network, and a Private Branch Exchange (PBX) 124. The PBX 124 can perform a function of a call server performing control of a VoIP call that is a voice call provided via a WLAN. The dual mode terminal 100 existing in the WLAN zone can be provided with a VoIP call service via the WLAN.

The mobile switching center 112 in the CDMA zone and the PBX 124 in the WLAN zone can be connected to a Public Switched Telephone Network (PSTN).

The CDMA zone and the WLAN zone can overlap each other. In a zone where the CDMA zone and the WLAN zone overlap each other, the dual mode terminal 100 can effect both a CDMA telecommunication and a VoIP telecommunication. Strictly speaking, a user telecommunicates using the dual mode terminal 100. However, for convenience, only the dual mode terminal 100 has been referred to below without mention of the user.

In the exemplary embodiments described below, the dual mode terminal 100 for performing call processing according to the present invention is assumed to be a CDMA terminal which includes a WLAN module capable of performing a VoIP function.

The WLAN module of the dual mode terminal 100 must have a function of recognizing a CDMA call state. The WLAN module can recognize a CDMA call state as an event or using an Application Program Interface (API) provided from the dual mode terminal 100, thereby determining the CDMA call state. The WLAN module can effect VoIP telecommunication corresponding to the result of determination of the CDMA call state.

For example, the WLAN module must check whether or not a CDMA call is connected to the dual mode terminal 100. When a CDMA call is connected, the WLAN module must receive information indicating that the dual mode terminal 100 is telecommunicating, receiving a phone call, or standing by, determine a CDMA call state, and process a VoIP call according to the determination result.

Figure 2:
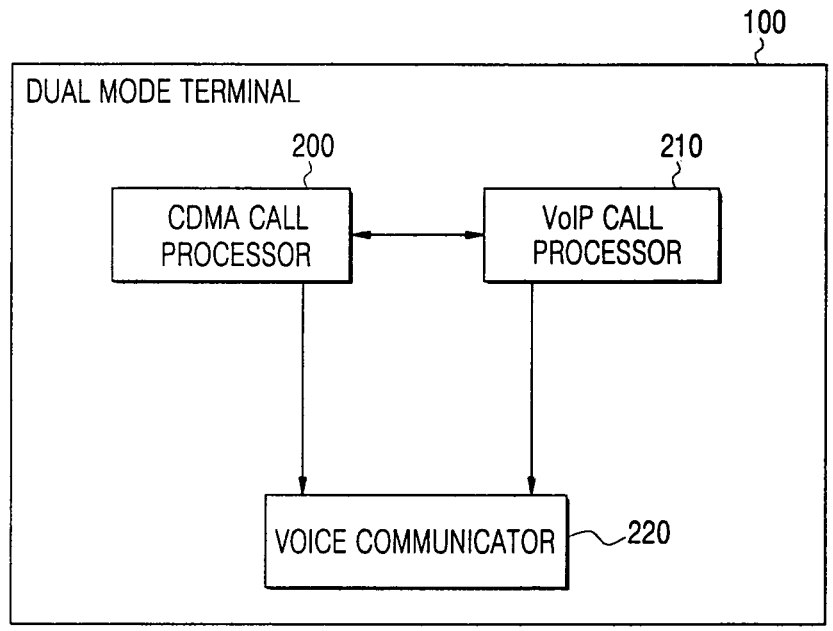
FIG. 2 is a block diagram of a dual mode terminal according to an exemplary embodiment of the present invention.

FIG. 2 is a block diagram of a dual mode terminal according to an exemplary embodiment of the present invention.

In particular, FIG. 2 illustrates a constitution of a dual mode terminal 100 (reference characteristics have been omitted below) having a CDMA function and a WLAN function. The dual mode terminal having a CDMA function and a WLAN function according to an exemplary embodiment of the present invention includes a CDMA call processor 200, a VoIP call processor 210, and a voice communicator 220.

The CDMA call processor 200 performs overall processing for a CDMA call, and the VoIP call processor 210 performs overall processing for a VoIP call, which is a voice call provided via a WLAN. The voice communicator 220 has functions required for performing voice telecommunication, such as a voice input function, a voice output function, and a voice input/output control function.

The voice input function can be regarded as a function of managing an overall process of transmitting external voice and sound data input via a voice input means, and the voice output function can be regarded as a function of managing an overall process of outputting voice and sound data generated from the dual mode terminal to the outside via a voice output means.

The voice input/output control function is for controlling the voice input function and the voice output function. Particularly in this embodiment, the voice input/output control function controls the voice input function and the voice output function according to whether the voice communicator 220 is used for CDMA telecommunication or VoIP telecommunication. Typical examples of the voice input means and the voice output means are a microphone and a speaker. The voice input means and the voice output means can be used for CDMA voice telecommunication or VoIP voice telecommunication.

In this embodiment, the VoIP call processor 210 determines a state of call processing for CDMA telecommunication (referred to as a "CDMA call state" below), sets up a VoIP call mode according to the determination, and performs VoIP telecommunication according to the set VoIP call mode. The VoIP call processor 210 receives CDMA call state information from the CDMA call processor 200 via an API or an event function and determines a CDMA call state.

A CDMA call state is classified into either a connected state or a disconnected state, for example. In addition, a connected CDMA call state can be further classified into a call in progress state, a call incoming state, and a standby state. Information on the CDMA call state is transmitted to the VoIP call processor 210 via the event function or the API.

According to a configuration of the dual mode terminal, the VoIP call processor 210 can request the CDMA call processor 200 to control CDMA telecommunication corresponding to a VoIP call state.

When CDMA telecommunication is configured to be preferentially processed and a CDMA call is received, the VoIP call processor 210 can stop VoIP telecommunication and begin the received CDMA call even in the middle of a VoIP call. When ongoing telecommunication is configured to be preferentially processed and a CDMA call is received during a VoIP call, the VoIP call processor 210 can request the CDMA call processor 200 to reject the received CDMA call. In general, CDMA telecommunication can be requested by a user besides reception of the CDMA call. However, since the user rarely attempts a CDMA call during a VoIP call, only the case where a CDMA call is received is mentioned above. The reception of the CDMA call in the middle of the VoIP call can be transmitted to the VoIP call processor 210 by the event function or the API.

In addition, when telecommunication is configured to be processed according to the selection of the user and a CDMA call is received during a VoIP call, the VoIP call processor 210 informs the user that CDMA telecommunication has been requested. Meanwhile, the VoIP call processor 210 can configure a ring to be muted during the VoIP call in order not to interrupt the VoIP call. When the VoIP call is finished, the ring volume can be restored to its original value. When the ring is muted, the VoIP call processor 210 can use various means, such as vibration, lamp flicker, or a display using an indicator, in order to inform the user that a CDMA call is being received. Among the means mentioned above, only one can be used, or two or more can be simultaneously used.

When the user requests immediate beginning of the CDMA call, the VoIP call processor 210 can request the CDMA call processor 200 to begin the CDMA call. On the other hand, when the user requests continuation of the ongoing VoIP call, the VoIP call processor 210 can ask the CDMA call processor 200 to reject the CDMA call. Likewise, when a VoIP call is received during a CDMA call, the VoIP call processor 210 can operate in the same manner. More specifically, when a VoIP call is received during a CDMA call, the VoIP call processor 210 informs the user of reception of the VoIP call and continues the CDMA call, or terminates the CDMA call and begins the VoIP call according to a request of the user. When the received CDMA call is intended to be rejected or the ongoing CDMA call is intended to be terminated, the VoIP call processor 210 asks the CDMA call processor 200 to perform the corresponding operation.

The CDMA call processor 200 can terminate the ongoing CDMA call or reject the received CDMA call according to the request of the VoIP call processor 210. In addition, when the VoIP call processor 210 requests the CDMA call processor 200 to reject a CDMA call due to a VoIP call, the CDMA call processor 200 can transmit a busy signal to the CDMA caller.

Functions of the VoIP call processor 210 are described below in further detail with reference to FIG. 3.

Figure 3:
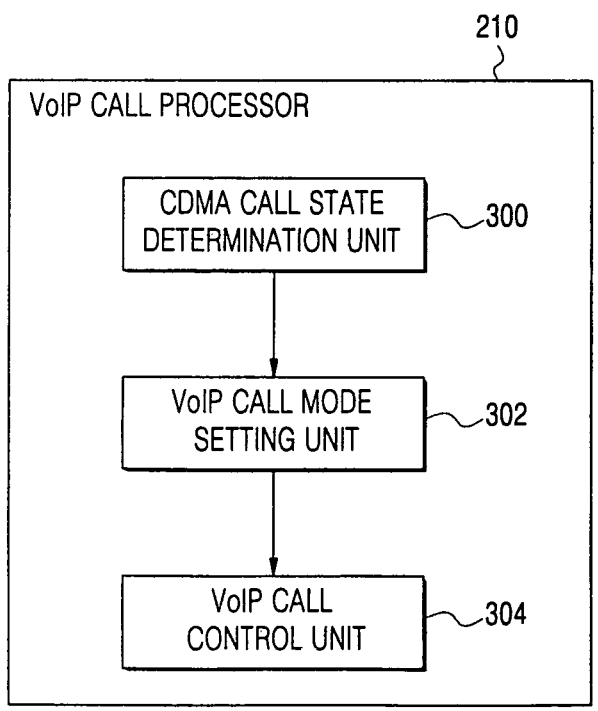
FIG. 3 is a block diagram of a Voice over Internet Protocol (VoIP) call processor that is a component of the dual mode terminal of FIG. 2.

FIG. 3 is a block diagram of the VoIP call processor of the dual mode terminal of FIG. 2.

The VoIP call processor 210 includes a CDMA call state determination unit 300, a VoIP call mode setting unit 302, and a VoIP call control unit 304.

The CDMA call state determination unit 300 can determine a CDMA call state according to information transmitted via an event function or an API.

The VoIP call mode setting unit 302 configures a VoIP call mode corresponding to the CDMA call state determined by the CDMA call state determination unit 300. For example, the VoIP call mode setting unit 302 can configure a VoIP call mode according to whether the CDMA call state is a connected state or a disconnected state.

When the CDMA call state is determined to be a connected state, the VoIP call mode setting unit 302 can reject a VoIP call. When the dual mode terminal is based on Session Initiation Protocol (SIP) and an invite message, which is a VoIP call request message, is received, the VoIP call mode setting unit 302 can be configured to automatically transmit a reject message in response to the invite message, thereby rejecting the VoIP call. Meanwhile, when the CDMA call state is determined to be the disconnected state and a VoIP call is received, the VoIP call mode setting unit 302 can perform VoIP call processing.

Call processing performed by the dual mode terminal having the above-described functions is described below with reference to the appended drawings.

Figure 4:
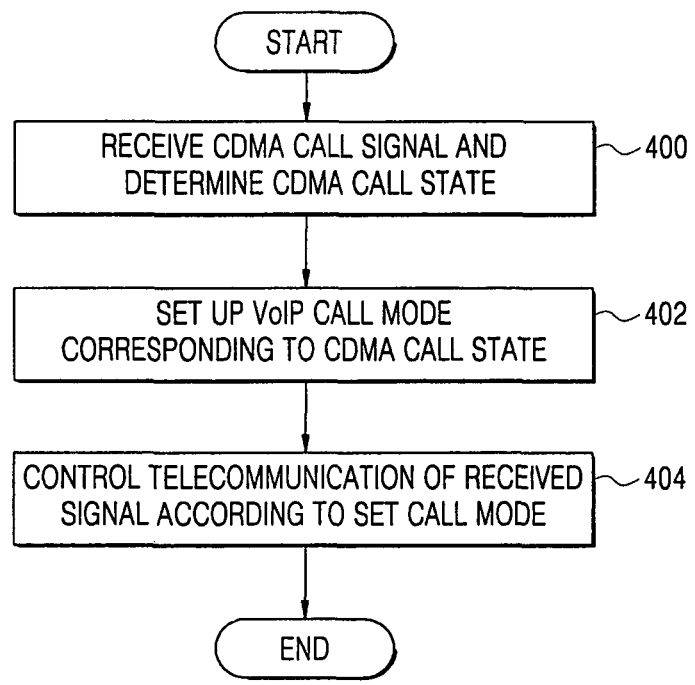
FIG. 4 is a flowchart of a call processing process in a dual mode terminal according to an exemplary embodiment of the present invention.

FIG. 4 is a flowchart of call processing in the dual mode terminal according to an exemplary embodiment of the present invention.

In step 400, the call processing apparatus (referred to as "apparatus of the present invention" below) in the dual mode terminal according to the present invention determines a CDMA call state. The determination of the CDMA call state can be performed by the CDMA call state determination unit 300 of the VoIP call processor 210. In step 402, the apparatus of the present invention sets up a VoIP call mode corresponding to the determined CDMA call state. The apparatus of the present invention can register the set VoIP call mode in a VoIP call server. In step 404, the apparatus of the present invention performs call control for VoIP calls according to the set call mode.

Call processing in a dual mode terminal according to an exemplary embodiment of the present invention in which the invention is applied to an M4300 swing phone terminal of Samsung Electronics Company, which is a CDMA terminal supporting a WLAN, is described below. In this embodiment, SOHO master of Samsung Electronics is used as a VoIP call server.

The CDMA call processor 200 and the VoIP call processor 210 of the terminal can be separately embodied as software. The CDMA call processor 200 can be embodied by a CDMA program, and the VoIP call processor 210 can be embodied by a SOHO softphone program.

A user runs the CDMA program for CDMA use, and the SOHO softphone program for VoIP use.

When a CDMA call begins, a CDMA call determination module of the SOHO softphone program senses a signal informing that the CDMA call has begun. A VoIP call mode setting module of the SOHO softphone program shifts a CDMA call state to an ongoing call state, and requests a VoIP call control module to reject VoIP calls. The VoIP call control module of the SOHO softphone program informs SOHO master, which is a VoIP call server, that it is not possible to perform a VoIP call.

When the CDMA call is finished, the SOHO softphone program senses a signal informing that the CDMA call has finished. When a CDMA call state shifts to a standby state, the VoIP call mode setting module informs the VoIP call control module that VoIP telecommunication is enabled. The VoIP call control module of the SOHO softphone program informs the VoIP call server that VoIP telecommunication is enabled.

When a CDMA call is received during a VoIP call, the SOHO softphone program senses a signal informing that a CDMA call is received. When the signal informing that the CDMA call is received is input during a VoIP call, the SOHO softphone program can inform the user that the CDMA call is received using a method previously indicated by the user. When CDMA reception occurs during a VoIP call and a CDMA call state shifts to the call in progress state, the VoIP call is automatically terminated. On the contrary, when VoIP call is intended to continue even though the CDMA call is received, the CDMA call can be ignored.

When beginning the CDMA call and automatically terminating the VoIP program, the SOHO softphone program registers call rejection in the VoIP call server in order to prevent re-reception of a VoIP call. During the CDMA call, the SOHO softphone program registers that a VoIP call will not be received in the VoIP call server against a case where a VoIP telephone call is received, or sets up a rejection signal to be automatically output in response to reception of a VoIP call.

When an invite message requesting reception of a VoIP call is received during a CDMA call, the VoIP program based on the SIP can be internally configured to automatically send a reject message in response to the invite message.

When the CDMA call is finished and VoIP reception is configured to be rejected in the VoIP call server, the SOHO softphone program cancels the setting, thereby allowing VoIP reception thereafter. The VoIP program based on SIP processes the reception request of the invite message using a conventional method.

According to the present invention, exemplary embodiments of which are described above, VoIP call processing and CDMA call processing are related to each other, thereby enabling users to conveniently use a VoIP program and a CDMA program together in a CDMA terminal supporting a WLAN. This opens-the door to a new form of business. Since a CDMA program and a VoIP program can be used together, VoIP telecommunication and CDMA telecommunication are both available in a WLAN hot spot zone, and CDMA telecommunication is available outside the hot spot zones. In addition, a user can use both a CDMA program and a VoIP program without collision.

The present invention allows voice telecommunication services embodied by different wireless technologies to be used without collision, thereby enhancing user convenience. In addition, the present invention facilitates joint use of voice telecommunication services embodied by different wireless technologies, thereby providing a substantial dual mode terminal function.

While the present invention has been described with reference to exemplary embodiments thereof, it will be understood by those skilled in the art that various modifications in form and detail can be made therein without departing from the scope of the present invention as defined by the following claims.

What is claimed is:

1. An apparatus, comprising:
a Code Division Multiple Access (CDMA) call processor configured to control a CDMA call service via a CDMA network; and
a Voice over Internet Protocol (VoIP) call processor configured to determine a CDMA call state in response to receiving a VoIP call via a Wireless Local Area Network (WLAN), to configure a VoIP call mode in accordance with a result of the determination, and to control a VoIP call service via the Wireless Local Area Network (WLAN) in accordance with the configured call mode,
wherein the VoIP call processor is configured to directly receive information from the CDMA call processor and send requests directly to the CDMA call processor,
wherein the VoIP call processor is configured to determine the CDMA call state using CDMA call state information received via either an event function or an Application Program Interface (API) from the CDMA call processor, and
wherein the VoIP call processor is configured to reject the received VoIP call in response to a determination indicating that the CDMA call state comprises a connected state.

2. The apparatus of claim 1, wherein the VoIP call processor is configured to register a rejection request corresponding to the received VoIP call in a VoIP call server.

3. The apparatus of claim 2, wherein the VoIP call processor is configured to register the rejection request corresponding to the received VoIP call in the VoIP call server using a Session Initiation Protocol (SIP) message.

4. The apparatus of claim 1, wherein the VoIP call processor comprises:
a CDMA call state determination unit configured to receive the CDMA call state information via either the event function or the Application Program Interface (API), and to determine the CDMA call state;
a VoIP call mode setting unit configured to configure the VoIP call mode in accordance with the determined CDMA call state; and
a VoIP call control unit configured to process a VoIP call in accordance with the configured VoIP call mode.

5. The apparatus of claim 1, wherein the VoIP call processor is configured to request the CDMA call processor to configure a CDMA call mode corresponding to a VoIP call state.

6. The apparatus of claim 1, further comprising a voice communicator configured to perform a voice input/output function to facilitate at least one of the CDMA call service and the VoIP call service.

7. The apparatus of claim 6, wherein the VoIP call processor is configured to process a CDMA call associated with the CDMA call service according to stored configuration information in response to a determination that the CDMA call is received during the VoIP call.

8. The apparatus of claim 7, wherein the VoIP call processor is configured to indicate reception of the CDMA call via at least one of vibration, a lamp flicker, and an indicator display in response to determining that the CDMA call is received during the VoIP call.

9. An apparatus, comprising:
a first call processor configured to control a first telecommunication service via a first network; and
a second call processor configured to determine a telecommunication state of the first telecommunication service in response to receiving a second telecommunication service call via a second network, to configure a telecommunication mode of a second telecommunication service in accordance with a result of the determination, and to control the second telecommunication service via the second network in accordance with the second telecommunication service telecommunication mode,
wherein the second call processor is configured to directly receive information from the first call processor and send requests directly to the first call processor,
wherein the second call processor is configured to determine the telecommunication state of the first telecommunication service using first telecommunication service information received via either an event function or an Application Program Interface (API) from the first call processor,
wherein the second call processor is configured to reject the received second telecommunication service call in response to a determination indicating that the telecommunication state of the first telecommunication service comprises a connected state, and
wherein the first network comprises a Code Division Multiple Access (CDMA) network and the second network comprises one of a Wireless Local Area Network (WLAN), a Wireless Broadband Internet (WiBro) network, and a Wireless Fidelity (WiFi) network.

10. The apparatus of claim 9, wherein the second network comprises a Wireless Local Area Network (WLAN).

11. A method of call processing in a dual mode terminal, the method comprising:
determining a Code Division Multiple Access (CDMA) call state;
configuring a Voice over Internet Protocol (VoIP) call mode corresponding to the determined CDMA call state in response to receiving a VoIP call via a Wireless Local Area Network (WLAN); and
processing the received VoIP call in accordance with the configured VoIP call mode,
wherein determining the CDMA call state comprises a VoIP call processor using information received directly from a CDMA call processor, and
wherein configuring the VoIP call mode comprises configuring the VoIP call mode to be a VoIP call rejection mode in response to the determined CDMA call state comprising a connected state.

12. The method of claim 11, further comprising registering the VoIP call mode in a VoIP call server.

13. The method of claim 12, wherein a VoIP call rejection request is registered in the VoIP call server using a Session Initiation Protocol (SIP) message in response to receipt of the VoIP call and the VoIP call mode comprising the VoIP call rejection mode.

14. A method of call processing in a dual mode terminal, the method comprising:
determining a telecommunication state of a first telecommunication service effected via a first network in response to receiving a second telecommunication service call via a second network;
configuring a telecommunication mode of a second telecommunication service corresponding to the determined telecommunication state of the first telecommunication service; and
controlling call processing for the second telecommunication service via the second network in accordance with the configured telecommunication mode,
wherein determining the telecommunication state of the first telecommunication service comprises receiving information directly from a first call processor configured to control the first telecommunication service and controlling, via a second call processor, the second telecommunication service using the received information,
wherein configuring the telecommunication mode of the second telecommunication service comprises configuring the telecommunication mode of the second telecommunication service to be a telecommunication rejection mode of the second telecommunication service in response to the determined telecommunication state of the first telecommunication service comprising a connected state, and
wherein the first network comprises a Code Division Multiple Access (CDMA) network and the second network comprises one of a Wireless Local Area Network (WLAN), a Wireless Broadband Internet (WiBro) network, and a Wireless Fidelity (WiFi) network.

15. The method of claim 14, wherein the second network comprises a Wireless Local Area Network (WLAN).

* * * * *